US012605983B2

(12) United States Patent
Ishikawa et al.

(10) Patent No.: US 12,605,983 B2
(45) Date of Patent: Apr. 21, 2026

(54) AIR BLOWING SYSTEM THAT CHANGES AIR BLOWING TIME PERIOD BASED ON INFORMATION ON HOW EASILY OCCUPANT RECOVERS FROM MOTION SICKNESS

(71) Applicant: TOYOTA BOSHOKU KABUSHIKI KAISHA, Aichi (JP)

(72) Inventors: Takuya Ishikawa, Aichi (JP); Hiroyuki Yamashiro, Kyoto (JP); Naoki Fujikawa, Aichi (JP); Keisuke Onoda, Aichi (JP)

(73) Assignee: TOYOTA BOSHOKU KABUSHIKI KAISHA, Aichi (JP)

( * ) Notice: Subject to any disclaimer, the term of this patent is extended or adjusted under 35 U.S.C. 154(b) by 225 days.

(21) Appl. No.: 18/211,846

(22) Filed: Jun. 20, 2023

(65) Prior Publication Data

US 2023/0415542 A1      Dec. 28, 2023

(30) Foreign Application Priority Data

Jun. 23, 2022    (JP) ................................. 2022-101399

(51) Int. Cl.
*B60H 1/00*                (2006.01)
(52) U.S. Cl.
CPC ..... *B60H 1/00742* (2013.01); *B60H 1/00821* (2013.01)
(58) Field of Classification Search
CPC ........................ B60H 1/00821; B60H 1/00742
See application file for complete search history.

(56) References Cited

U.S. PATENT DOCUMENTS

| | | | | |
|---|---|---|---|---|
| 11,897,480 | B1 * | 2/2024 | Belo .................... | B60W 40/105 |
| 2005/0011692 | A1 * | 1/2005 | Takahashi ............... | B60R 16/04 |
| | | | | 180/68.5 |

(Continued)

FOREIGN PATENT DOCUMENTS

| | | |
|---|---|---|
| JP | 2015-182755 | 10/2015 |
| JP | 6676757 | 4/2020 |
| JP | 2021-178607 | 11/2021 |

OTHER PUBLICATIONS

Office Action issued in Japan Patent Application No. 2022-101399, dated Sep. 9, 2025, together with English translation thereof.

*Primary Examiner* — Jess Whittington
(74) *Attorney, Agent, or Firm* — Greenblum & Bernstein, P.L.C.

(57)      ABSTRACT

Provided is an air blowing system including: an air blowing section configured to blow air into an environment in which an occupant of a moving object is present; a start-of-blowing setting section configured to set a blowing starting timing at which the air blowing section starts blowing air; a stop-of-blowing setting section configured to set a blowing stopping timing at which the air blowing section stops blowing air; and a control section configured to control air blowing performed by the air blowing section, during a period from the blowing starting timing set by the start-of-blowing setting section to the blowing stopping timing set by the stop-of-blowing setting section, the stop-of-blowing setting section setting the blowing stopping timing in accordance with information given in advance by the occupant about how easily the occupant recovers from motion sickness.

7 Claims, 4 Drawing Sheets

(56) References Cited

U.S. PATENT DOCUMENTS

| | | | |
|---|---|---|---|
| 2018/0161537 A1* | 6/2018 | Ketels | B60N 2/99 |
| 2019/0022347 A1* | 1/2019 | Wan | A61B 5/18 |
| 2020/0114150 A1* | 4/2020 | Monteiro | A61F 7/0053 |
| 2020/0114929 A1* | 4/2020 | Wan | A61B 5/02055 |
| 2020/0289694 A1* | 9/2020 | Kelsen | A61L 9/122 |
| 2021/0162888 A1* | 6/2021 | Lee | B60N 2/0239 |
| 2021/0213237 A1* | 7/2021 | Kelsen | B60H 1/00742 |
| 2022/0024459 A1* | 1/2022 | Park | B60W 50/16 |
| 2022/0032956 A1* | 2/2022 | Wolff | G06V 40/168 |

* cited by examiner

1

AIR BLOWING SYSTEM THAT CHANGES AIR BLOWING TIME PERIOD BASED ON INFORMATION ON HOW EASILY OCCUPANT RECOVERS FROM MOTION SICKNESS

This Nonprovisional application claims priority under 35 U.S.C. § 119 on Patent Application No. 2022-101399 filed in Japan on Jun. 23, 2022, the entire contents of which are hereby incorporated by reference.

TECHNICAL FIELD

The present disclosure relates to air blowing systems.

BACKGROUND ART

Patent Literature 1 discloses a neck fan capable of adjusting a current of air directed to an occupant, in accordance with the occupant's skin temperature ascertained by an infrared sensor.

CITATION LIST

Patent Literature

[Patent Literature 1]
Japanese Patent No. 6676757

SUMMARY OF INVENTION

Technical Problem

However, in such a case in which air blown out in accordance with occupant's biological information such as the skin temperature is used to refresh an occupant, the detection accuracy of the biological information may be insufficient to appropriately control the blowing of air to satisfy the occupant's recognition.

An object of an aspect of the present disclosure is to provide a system capable of effectively refreshing an occupant by controlling blowing of air in accordance with information given by the occupant.

Solution to Problem

An air blowing system in accordance with an aspect of the present disclosure, includes: an air blowing section configured to blow air into an environment in which an occupant of a moving object is present; a start-of-blowing setting section configured to set a blowing starting timing at which the air blowing section starts blowing air; a stop-of-blowing setting section configured to set a blowing stopping timing at which the air blowing section stops blowing air; and a control section configured to control air blowing performed by the air blowing section, during a period from the blowing starting timing set by the start-of-blowing setting section to the blowing stopping timing set by the stop-of-blowing setting section, the stop-of-blowing setting section setting the blowing stopping timing in accordance with information given in advance by the occupant about how easily the occupant recovers from motion sickness.

The air blowing system in accordance with each aspect of the present disclosure may be realized by a computer. In such a case, the present disclosure encompasses (i) a control program of the air blowing system which causes the computer to serve as the units (software elements) included in the air blowing system for realizing the air blowing system and (ii) a computer-readable storage medium storing therein the control program.

Advantageous Effects of Invention

According to an aspect of the present disclosure, it is possible to effectively refresh an occupant by controlling blowing of air in accordance with information given by the occupant.

DESCRIPTION OF EMBODIMENTS

Figure 1:
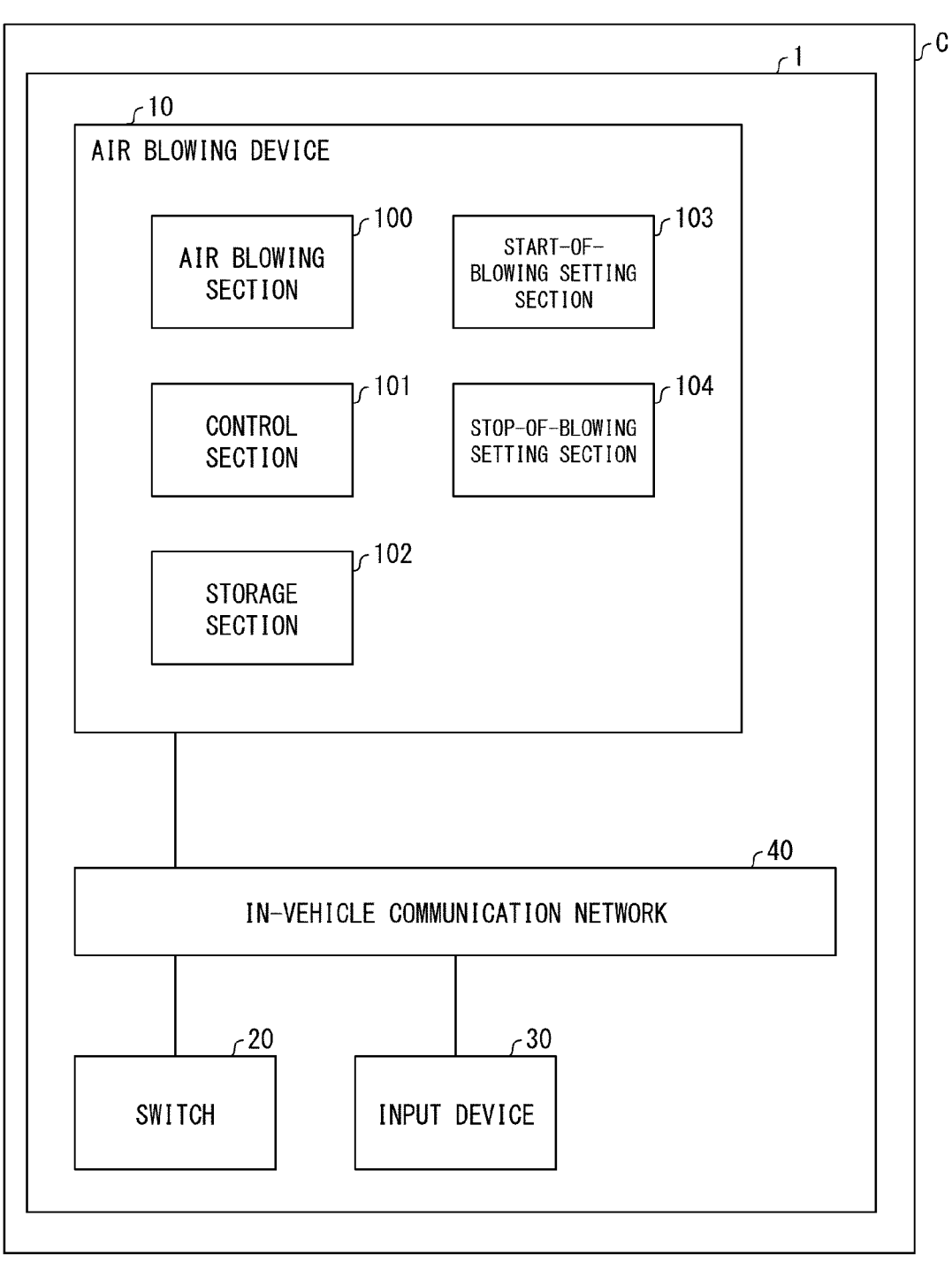
FIG. 1 is a block diagram for explaining a functional configuration of an air blowing system in accordance with an embodiment of the present disclosure.

The following will describe in detail an embodiment of the present disclosure with reference to FIGS. 1 to 4. FIG. 1 is a block diagram for explaining a functional configuration of an air blowing system in accordance with the embodiment of the present disclosure. An air blowing system 1 illustrated in FIG. 1 is mounted in a vehicle C, which is an example of a moving object, and the air blowing system 1 includes an air blowing device 10, a switch 20, an input device 30, and an in-vehicle communication network 40. The air blowing device 10 includes an air blowing section 100, a control section 101, a storage section 102, a start-of-blowing setting section 103, and a stop-of-blowing setting section 104. The air blowing section 100 is configured to blow air into the environment of the passenger compartment of the vehicle C in which an occupant is present. Examples of the configuration of the air blowing section 100 will be described later with reference to FIGS. 2A and 2B.

The control section 101 may be, for example, an electronic control unit (ECU), and may execute a control program stored in the storage section 102 to control the air blowing section 100.

The storage section 102 includes a nonvolatile storage section configured to store therein the control program, and also includes a volatile storage section serving as a work area when the program is executed. The storage section 102 stores therein information on the occupant in the vehicle C about how easily the occupant recovers from motion sickness. The information about how easily the occupant recovers from motion sickness refers to information indicating whether the occupant is recognizing that the occupant easily recovers from motion sickness or that the occupant does not easily recover from motion sickness. "The occupant easily recover from motion sickness" refers to a fact that, when getting motion sickness, the occupant tends to easily recover while at rest in the vehicle C. On the other hand, "the occupant does not easily recover from motion sickness"

refers to a fact that the occupant tends to experience lingering motion sickness even when the occupant rests in the vehicle C. The information about how easily the occupant recovers from motion sickness may be registered in advance in the storage section 102 by the occupant in the vehicle C by using the switch 20 or the input device 30. Who stores, in the storage section 102, the information about how easily the occupant recovers from motion sickness is not limited to the occupant concerned, and a representative of occupants in the vehicle C may register the information.

The switch 20 may include, for example, a seat switch situated at a seat of the vehicle C and a switch of an air conditioner provided on an instrument panel. The seat switch situated at the seat of the vehicle C is provided with, for example, a switch for causing the seat to recline.

The input device 30 may include, for example, an input device having a display unit, such as a touch screen of a navigation system mounted in the vehicle C, and a display unit and control switches of an audio system.

For example, the start-of-blowing setting section 103 may be realized by the control section 101 executing the control program stored in the storage section 102. Alternatively, the start-of-blowing setting section 103 may be realized by another control device other than the control section 101. The start-of-blowing setting section 103 is configured to set a blowing starting timing $T_{START}$ at which the air blowing section 100 starts blowing air. The start-of-blowing setting section 103 obtains an output signal outputted from the switch 20 through the in-vehicle communication network 40. For example, when the occupant turns on the switch 20, the start-of-blowing setting section 103 outputs, to the control section 101, a signal indicating the blowing starting timing $T_{START}$. The control section 101 causes the air blowing section 100 to start blowing air in accordance with the output signal from the start-of-blowing setting section 103.

For example, the stop-of-blowing setting section 104 may be realized by the control section 101 executing the control program stored in the storage section 102. Alternatively, the stop-of-blowing setting section 104 may be realized by another control device other than the control section 101. The stop-of-blowing setting section 104 is configured to set a blowing stopping timing $T_{STOP}$ at which the air blowing section 100 stops blowing air. The stop-of-blowing setting section 104 obtains an output signal outputted from the switch 20 through the in-vehicle communication network 40. For example, when the occupant turns off the switch 20, the stop-of-blowing setting section 104 outputs, to the control section 101, a signal indicating the blowing stopping timing $T_{STOP}$. The control section 101 causes the air blowing section 100 to stop blowing air in accordance with the output signal from the stop-of-blowing setting section 104. Further, the stop-of-blowing setting section 104 sets the blowing stopping timing $T_{STOP}$ to a timing at which a predetermined time period has elapsed from the blowing starting timing $T_{START}$.

Figure 2A:
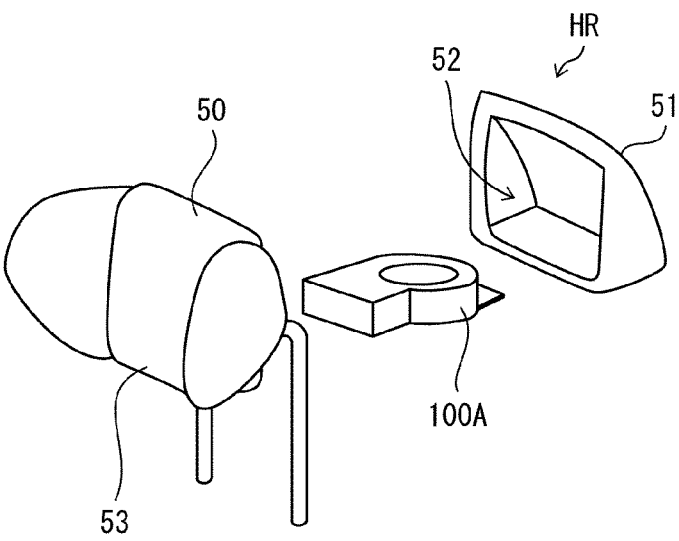
FIG. 2A is a diagram illustrating an example of an air blowing section included in the air blowing system in accordance with the embodiment of the present disclosure.
Figure 2B:
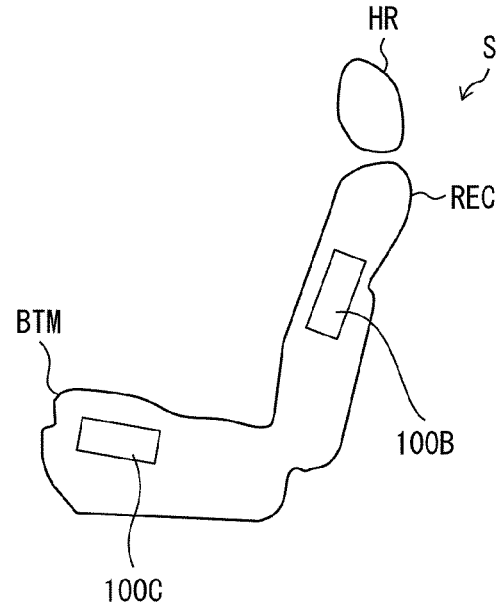
FIG. 2B is a diagram illustrating another example of the air blowing section included in the air blowing system in accordance with the embodiment of the present disclosure.

Each of FIGS. 2A and 2B depicts an example of the air blowing section 100. FIG. 2A is a perspective view illustrating an example of a headrest HR of a seat S. FIG. 2B is a schematic cross-sectional view illustrating an example of the seat S of the vehicle C. A blower 100A illustrated in FIG. 2A is an example of the air blowing section 100. The headrest HR includes a front cushion 50 and a rear part 51. The rear part 51 has a cavity 52 thereinside. The blower 100A is mounted inside the cavity 52. The blower 100A draws thereinto air present inside the cavity 52, and then, blows out the air through an outlet 53 disposed in, for example, a lower portion of the front cushion 50.

FIG. 2B illustrates ventilators 100B and 100C, each of which is an example of the air blowing section 100. The ventilator 100B is installed inside a reclining part REC of the seat S. The ventilator 100C is installed inside a seat bottom part BTM of the seat S. The ventilators 100B and 100C constitute a seat ventilation system (SVS), and blow air to the environment around the seat S. The ventilator 100B has an airflow temperature adjusting function for adjusting the temperature of a stream of air blown out from the ventilator 100B.

The air blowing system 1 of FIG. 1 may be provided with one or both of the blower 100A illustrated in FIG. 2A and the ventilator 100B illustrated in FIG. 2B, or alternatively, may be provided with another air blowing section 100, such as an air conditioner.

The air blowing system 1 has a function of refreshing an occupant in the vehicle C by causing the air blowing section 100 to blow air. It should be noted that refreshing an occupant includes curing an occupant who gets motion sickness, and also includes calming down an occupant and waking up a sleepy driver or the like.

Figure 3:
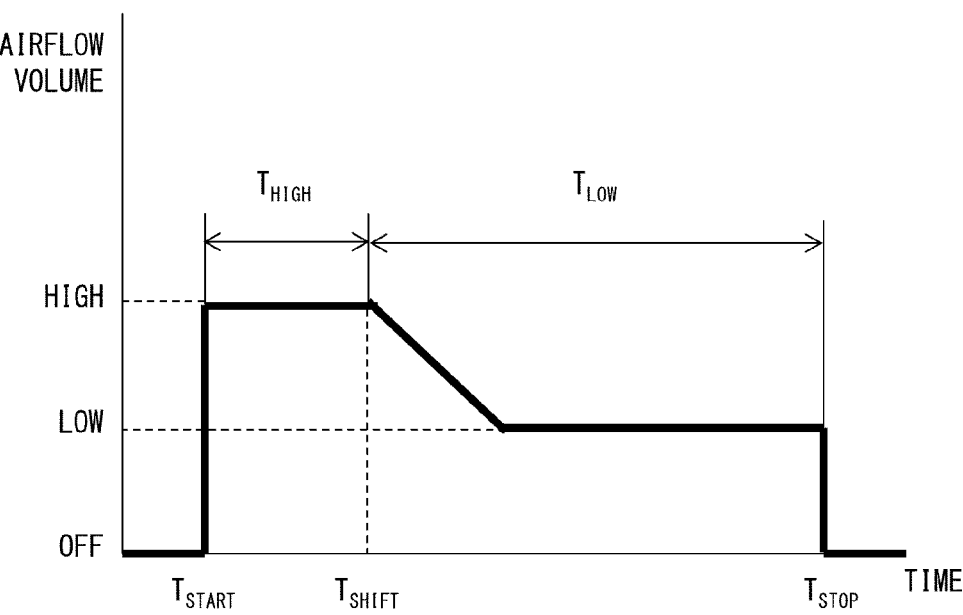
FIG. 3 is a diagram illustrating an example of operation of the air blowing system in accordance with the embodiment of the present disclosure.
Figure 4:
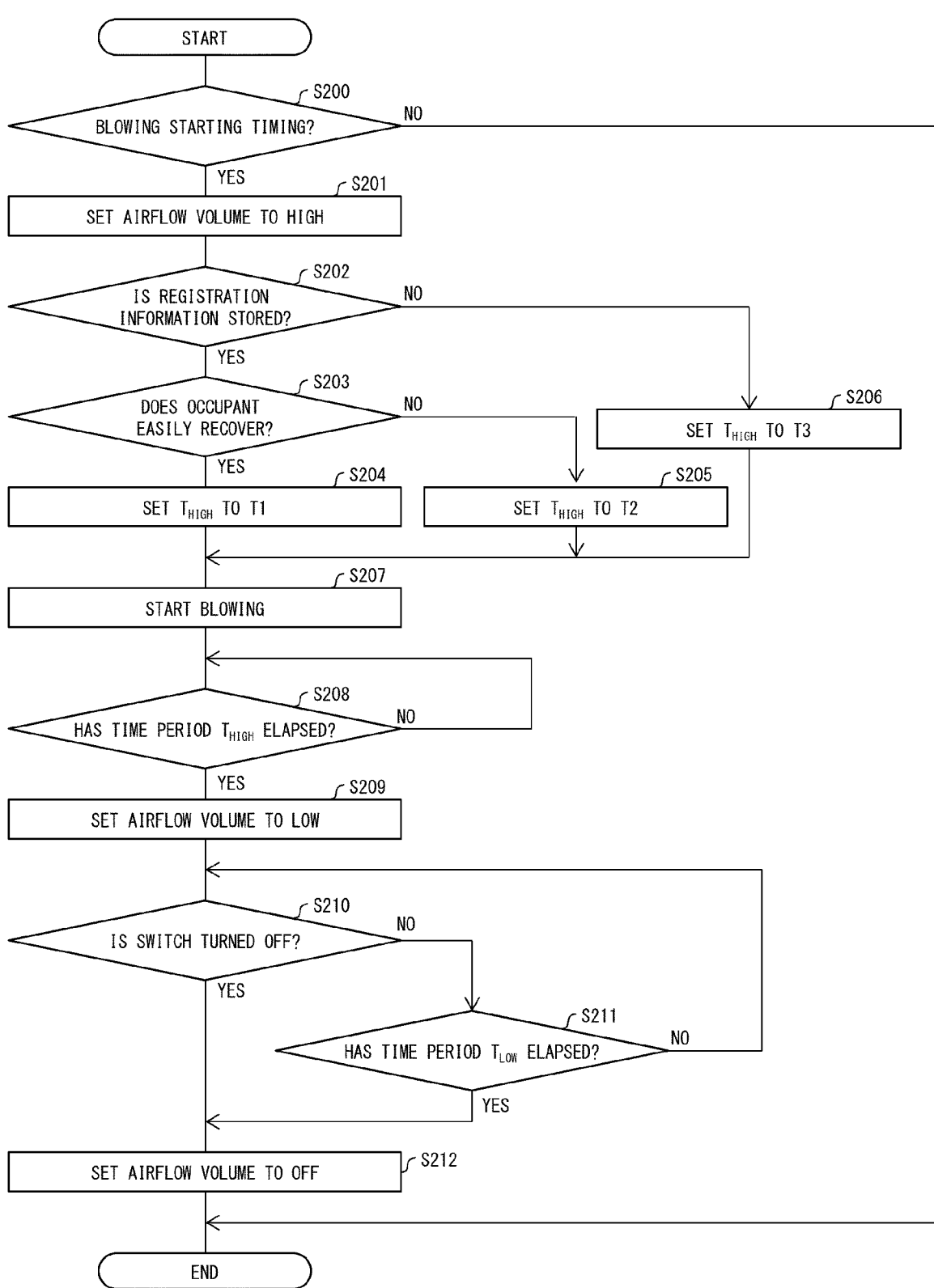
FIG. 4 is an example of a flowchart regarding the operation of the air blowing system in accordance with the embodiment of the present disclosure.

With reference to FIGS. 3 and 4, the following will describe an example of operation of the air blowing system 1 executed by the control section 101 to realize the function of refreshing an occupant in the vehicle C. FIG. 3 is a diagram illustrating an example of control of blowing of air executed to refresh an occupant. FIG. 4 is a flowchart illustrating an example of operation of the air blowing system 1 carried out by the control section 101.

As illustrated in FIG. 3, the control section 101 is configured to set the airflow volume of the air blowing section 100 to at least three modes including "HIGH", "LOW", and "OFF".

$T_{START}$ in FIG. 3 is a blowing starting timing set by the start-of-blowing setting section 103. $T_{STOP}$ in FIG. 3 is a blowing stopping timing set by the stop-of-blowing setting section 104.

Before starting operating the air blowing system 1, the control section 101 accepts registration of information on an occupant in the vehicle C about how easily the occupant recovers from motion sickness. For example, the control section 101 accepts, from the input device 30, an input of registration information about how easily the occupant recovers from motion sickness when the occupant boards the vehicle C, and stores the registration information in the storage section 102.

When the occupant in the vehicle C gives, by using the input device 30, information that the occupant easily recovers from motion sickness, information indicating that "the occupant easily recovers from motion sickness", such as flag "0", is stored in the storage section 102. In contrast, when the occupant in the vehicle C gives, by using the input device 30, information that the occupant does not easily recover from motion sickness, information indicating that "the occupant does not easily recover from motion sickness", such as flag "1", is stored in the storage section 102.

In S200 of FIG. 4, the control section 101 determines whether a blowing starting timing $T_{START}$ has been reached. For example, when the switch 20 is turned on, the control section 101 receives a signal indicating the blowing starting timing $T_{START}$ outputted from the start-of-blowing setting section 103 and thus determines that the blowing starting timing $T_{START}$ has been reached (YES in S200), so that the operation proceeds to S201. In a case in which the switch 20 is not turned on, the control section 101 receives no signal indicating the blowing starting timing $T_{START}$ from the start-of-blowing setting section 103 (NO in S200), so that the control section 101 terminates the operation of FIG. 4. After terminating the operation of FIG. 4, the control section 101 starts repeating the operation of FIG. 4 at predetermined execution intervals. The control section 101 may execute another operation that uses the air blowing section 100 while the operation of FIG. 4 is not executed.

As illustrated in FIG. 3, when the blowing starting timing $T_{START}$ has been reached, the control section 101 sets the airflow volume of the air blowing section 100 to "HIGH" (S201 in FIG. 4). After the control section 101 sets the airflow volume of the air blowing section 100 to "HIGH", the operation proceeds to S202 of FIG. 4.

In S202, the control section 101 determines whether the registration information on the occupant in the vehicle C about how easily the occupant recovers from motion sickness has been stored in the storage section 102. If the registration information about how easily the occupant recovers from motion sickness has been stored in the storage section 102 (YES in S202) and the stored information indicates that "the occupant easily recovers from motion sickness" (YES in S203), the control section 101 sets the time period $T_{HIGH}$ to a predetermined first time period T1 (S204). As illustrated in FIG. 3, the time period $T_{HIGH}$ is a period of time in which air is blown out in a state in which the airflow volume thereof is "HIGH". The first time period T1 may be set to a period of time that is within a range of 1 minute to 5 minutes, for example.

If the registration information about how easily the occupant recovers from motion sickness has been stored in the storage section 102 (YES in S202 of FIG. 4) and the stored information indicates that "the occupant does not easily recover from motion sickness" (NO in S203), the control section 101 sets the time period $T_{HIGH}$ to a predetermined second time period T2 (S205). The second time period T2 may be set to a period of time that is longer than the first time period T1 and that is within a range of 11 minutes to 15 minutes, for example.

If no registration information about how easily the occupant recovers from motion sickness has been stored in the storage section 102, or if the occupant has not registered information about "how easily the occupant recovers from motion sickness" because, for example, the occupant is uncertain about how easily the occupant recovers from motion sickness (NO in S202), the control section 101 sets the time period $T_{HIGH}$ to a predetermined third time period T3 (S206). The third time period T3 may be set to a period of time that is longer than the first time period T1 and is shorter than the second time period T2, and that is within a range of 6 minutes to 10 minutes, for example.

When the time period $T_{HIGH}$ is set in S204, S205, or S206 of FIG. 4, the control section 101 causes the air blowing section 100 to start blowing air (S207), and the operation proceeds to S208. In S208, until the time period $T_{HIGH}$ elapses since the air blowing section 100 starts blowing air at the blowing starting timing $T_{START}$ in S207 (NO in S208), the control section 101 leaves the air blowing section 100 blowing air at the "HIGH" airflow volume as illustrated in FIG. 3.

When the time period $T_{HIGH}$ has elapsed from the blowing starting timing $T_{START}$ of S207 of FIG. 4 and a setting changing timing $T_{SHIFT}$ has been reached (YES in S208), the control section 101 sets the airflow volume of the air blowing section 100 to "LOW" (S209). After the airflow volume of the air blowing section 100 is set to "LOW", the airflow volume of the air blowing section 100 is controlled so as to gradually decrease to a set value of the "LOW" airflow volume as illustrated in FIG. 3. During the gradual decrease of the airflow volume to the set value of the "LOW" airflow volume, the air blowing section 100 blows air in accordance with a target decreased volume at that time, and then, when the airflow volume has reached the "LOW" airflow volume, the air blowing section 100 blows air at the "LOW" airflow volume. By doing this, it is possible not only to increase the success rate of refresh of the occupant, but also to decrease the probability that the occupant who feels sufficiently refreshed be bothered by the strong airflow.

When the occupant in the vehicle C turns off the switch 20 (YES in S210), the stop-of-blowing setting section 104 sets a blowing stopping timing $T_{STOP}$. At this time, the control section 101 sets the airflow volume of the air blowing section 100 to a value of "OFF", to make the blowing of air stopped (S212), so that the operation of FIG. 4 is terminated.

Further, as illustrated in FIG. 3, even when the occupant in the vehicle C does not turned off the switch 20 (NO in S210), the stop-of-blowing setting section 104 sets the blowing stopping timing $T_{STOP}$ when a predetermined time period $T_{LOW}$ has elapsed (YES in S211) from the setting changing timing $T_{SHIFT}$ that is a timing at which the time period $T_{HIGH}$ (the first time period T1, the second time period T2, or the third time period T3) has elapsed (YES in S208) from the blowing starting timing $T_{START}$ of S207, the stop-of-blowing setting section 104 sets the blowing stopping timing $T_{STOP}$, and the control section 101 sets the airflow volume of the air blowing section 100 to the value of "OFF", to make the blowing of air stopped (S212), so that the operation of FIG. 4 is terminated.

Thus, even when the occupant in the vehicle C does not turn off the switch 20, the stop-of-blowing setting section 104 sets the blowing stopping timing $T_{STOP}$ to a timing at which a predetermined time period $T_{HIGH}+T_{LOW}$ has elapsed from the blowing starting timing $T_{START}$. At this time, the blowing stopping timing $T_{STOP}$ set by the stop-of-blowing setting section 104 is based on the time period $T_{HIGH}$. That is, the stop-of-blowing setting section 104 can set the blowing stopping timing $T_{STOP}$ in accordance with the registration information about how easily the occupant recovers from motion sickness given by the occupant in advance and stored in the storage section 102.

The predetermined time period $T_{HIGH}+T_{LOW}$ is set so that the time period $T2+T_{LOW}$, for use in a case in which the occupant in the vehicle C has given information that the occupant does not easily recover from motion sickness, is longer than the time period $T1+T_{LOW}$, for use in a case in which the occupant in the vehicle C has given information that the occupant does not easily recover from motion sickness, by an amount of time corresponding to T2–T1.

Further, when the occupant has registered no registration information in the storage section 102 about how easily the occupant recovers from motion sickness, such as a case in which the occupant in the vehicle C has not given any information about how easily the occupant recovers from motion sickness, the predetermined time period $T_{HIGH}+T_{LOW}$ is set to the time period $T3+T_{LOW}$, which is longer than the time period $T1+T_{LOW}$ and is shorter than the time period $T2+T_{LOW}$.

In this way, the control section 101 controls the air blowing section 100 during a period from the blowing starting timing $T_{START}$ set by the start-of-blowing setting section 103 to the blowing stopping timing $T_{STOP}$ set by the stop-of-blowing setting section 104. Further, by automatically stopping blowing of air from the air blowing section 100, it is possible to save energy such as electric power.

Advantageous Effects

As in the foregoing, the air blowing system 1 includes: an air blowing section 100 configured to blow air into the vehicle C; a start-of-blowing setting section 103 configured to set a blowing starting timing $T_{START}$ at which the air blowing section 100 starts blowing air; a stop-of-blowing setting section 104 configured to set a blowing stopping timing $T_{STOP}$ at which the air blowing section 100 stops blowing air; and a control section 101 configured to control air blowing performed by the air blowing section 100, during a period from the blowing starting timing $T_{START}$ set by the start-of-blowing setting section 103 to the blowing stopping timing $T_{STOP}$ set by the stop-of-blowing setting section 104, and the stop-of-blowing setting section 104 sets the blowing stopping timing $T_{STOP}$ in accordance with information given in advance by the occupant about how easily the occupant recovers from motion sickness. Thus, since the air blowing system 1 controls blowing of air in accordance with information given in advance about how easily the occupant recovers from motion sickness, it is possible to effectively refresh the occupant who gets motion sickness or the like. Further, since the air blowing system 1 is capable of setting the blowing stopping timing $T_{STOP}$ without using biological information obtained with insufficient detection accuracy, it is possible to stably operate the air blowing system 1.

[Variations]

According to the foregoing embodiment, the control section 101 is configured to set the airflow volume of the air blowing section 100 to "LOW" (S209) when the time period $T_{HIGH}$ has elapsed (YES in S208) from the timing at which blowing of air in the "HIGH" airflow volume is started (S207). However, use of the "LOW" airflow volume of air blown may be eliminated. That is, the airflow volume may be immediately set to the value of "OFF", when the time period $T_{HIGH}$ has elapsed (YES in S208) since blowing of air in the "HIGH" airflow volume is started (S207).

Further, according to the abovementioned embodiment, the control section 101 is configured so that the airflow volume of the air blowing section 100 is set to gradually decrease to the set value of the "LOW" airflow volume, as illustrated in FIG. 3, when the airflow volume of the air blowing section 100 is set to "LOW" (S209). However, the airflow volume may be immediately set to "LOW" when the time period $T_{HIGH}$ has elapsed (YES in S208) from the blowing starting timing $T_{START}$ (S207) at which blowing of air in the "HIGH" airflow volume is started.

According to the abovementioned embodiment, the information about how easily the occupant recovers from motion sickness is stored in the storage section 102 by using a flag; however, the data format of the information about how easily the occupant recovers from motion sickness is not limited thereto. For example, an occupant may be required to provide an evaluated value obtained by rating how easily the occupant recovers from motion sickness in three or more scales. In this case, the time period $T_{HIGH}$ may be proportional to a value provided by the occupant. Further, until the time period $T_{HIGH}$ elapses from the blowing starting timing $T_{START}$, the airflow volume of the air blowing section 100 may be proportional to the value provided by the occupant.

Further, the information about how easily the occupant recovers from motion sickness may be stored in the storage section 102 together with identification data for identifying the occupant. For example, the information about how easily the occupant recovers from motion sickness may be stored in the storage section 102 together with face information or voice information of the occupant. In a case in which the information about how easily the occupant recovers from motion sickness is stored in the storage section 102 together with the identification data, the air blowing system 1 may be provided with a camera capable of obtaining an image of the face of the occupant, a sound collecting unit configured to collect voice of the occupant, or the like, to achieve the face identification and the voice identification. Specifically, the control section 101 may verify the face information of the occupant stored in the storage section 102 against an image of the face taken with the camera, to identify the occupant. Then, the information on the identified occupant about how easily the occupant recovers from motion sickness may be obtained from the storage section 102.

According to the abovementioned embodiment, the air blowing device 10 includes the air blowing section 100, the control section 101, the storage section 102, the start-of-blowing setting section 103, and the stop-of-blowing setting section 104. However, the components other than the air blowing section 100 may be external to the air blowing device 10. For example, the control section 101 and the storage section 102 may be provided in another ECU situated inside the vehicle C, or alternatively, may be provided in an external server connected through electronic telecommunication line. Further, the control section 101 and the storage section 102 may be integrally constituted with the air blowing section 100. The start-of-blowing setting section 103 and the stop-of-blowing setting section 104 may be realized by a single component, or alternatively, may be included in the control section 101.

According to the abovementioned embodiment, the start-of-blowing setting section 103 is configured to set the blowing starting timing $T_{START}$ in accordance with an output signal from the switch 20. However, a method of setting the blowing starting timing $T_{START}$ is not limited thereto. For example, the start-of-blowing setting section 103 may set the blowing starting timing $T_{START}$ to a timing at which a predetermined fourth time period T4 has elapsed from start of traveling of the vehicle C. For example, the fourth time period T4 may be 30 minutes. Information about the timing at which the vehicle C starts traveling may be obtained from the vehicle control device to which signals from the wheel speed sensor or the like are inputted, or may be obtained from a navigation system or the like that detects the location of the vehicle C on the basis of, for example, GPS signals.

Further, the fourth time period T4 may vary depending on, for example, the information about how easily the occupant recovers from motion sickness given by the occupant, vibrations of the vehicle C obtained by the control system of the vehicle C, information on the velocity, acceleration, or the like, and information about a road on which the vehicle C travels. For example, when information indicating that the occupant in the vehicle C does not easily recover from motion sickness has been stored in the storage section 102, the blowing starting timing $T_{START}$ may be changed to an earlier timing. Further, when vibrations of the vehicle C and an average change in velocity exceed predetermined thresholds, or when the vehicle C is travelling on an unpaved road, the blowing starting timing $T_{START}$ may be changed to an earlier timing.

The abovementioned air blowing section 100 may be additionally provided with a cooling function to blow out a cooled air. Such a cooling function may be achieved by using, for example, a Peltier device.

The abovementioned embodiment and variations describe that the air blowing system 1 is mounted in the vehicle C, but this is not limited thereto. For example, any moving object other than the vehicle C, such as a train, a ship, and an aircraft, may be provided with the air blowing system 1.

[Software Implementation Example]

The functions of the air blowing system (hereinafter, referred to as the "system") can be realized by a program for causing a computer to function as the system, the program causing the computer to function as each control block (the control section 101, the start-of-blowing setting section 103, and the stop-of-blowing setting section 104) of the system.

In this case, the system includes, as hardware for executing the program, a computer which includes at least one control device (e.g., processor) and at least one storage device (e.g., memory). Each function described in the foregoing embodiments can be realized by executing the program by the control device and the storage device.

The program may be stored in one or more non-transitory storage mediums each of which can be read by the computer. This storage medium may or may not be provided in the above device. In the latter case, the program can be supplied to or made available to the device via any transmission medium such as a wired transmission medium or a wireless transmission medium.

Further, some or all of functions of respective control blocks can be realized by a logic circuit. For example, the present disclosure encompasses, in its scope, an integrated circuit in which a logic circuit that functions as each of the above-described control blocks. As another alternative, for example, it is possible to realize the functions of respective control blocks by a quantum computer.

The present disclosure is not limited to the above embodiments, but can be altered by a person skilled in the art within the scope of the claims. The present invention also encompasses, in its technical scope, any embodiment derived by combining technical means disclosed in differing embodiments.

Aspects of the present invention can also be expressed as follows:

An air blowing system in accordance with Aspect 1 of the present disclosure, includes: an air blowing section configured to blow air into an environment in which an occupant of a moving object is present; a start-of-blowing setting section configured to set a blowing starting timing at which the air blowing section starts blowing air; a stop-of-blowing setting section configured to set a blowing stopping timing at which the air blowing section stops blowing air; and a control section configured to control air blowing performed by the air blowing section, during a period from the blowing starting timing set by the start-of-blowing setting section to the blowing stopping timing set by the stop-of-blowing setting section, the stop-of-blowing setting section setting the blowing stopping timing in accordance with information given in advance by the occupant about how easily the occupant recovers from motion sickness.

With this configuration, it is possible to effectively refresh the occupant who gets motion sickness or the like, by controlling air blowing in accordance with information given in advance about how easily the occupant recovers from motion sickness.

An air blowing system in accordance with Aspect 2 of the present disclosure is configured so that, when the occupant has given information that the occupant easily recovers from motion sickness, the stop-of-blowing setting section sets the blowing stopping timing to a timing at which a predetermined time period has elapsed after lapse of a first time period from the blowing starting timing, and when the occupant has given information that the occupant does not easily recover from motion sickness, the stop-of-blowing setting section sets the blowing stopping timing to a timing at which the predetermined time period has elapsed after lapse of a second time period from the blowing starting timing, the second time period being longer than the first time period.

With this configuration, in a case in which the occupant has given information that the occupant does not easily recover from motion sickness, air is blown out for a longer period of time compared to a case in which the occupant has given information that the occupant easily recovers from motion sickness. Thus, it is possible to effectively refresh the occupant in accordance with the information given by the occupant.

An air blowing system in accordance with Aspect 3 of the present disclosure is configured so that, when the occupant has given no information about how easily the occupant recovers from motion sickness, the stop-of-blowing setting section sets the blowing stopping timing to a timing at which the predetermined time period has elapsed after lapse of a third time period from the blowing starting timing, the third time period being longer than the first time period and being shorter than the second time period.

With this configuration, in a case in which there is no information given in advance about how easily the occupant recovers from motion sickness, that is, in a case in which the occupant is uncertain about how easily the occupant recovers from motion sickness, the blowing of air is stopped after a timing at which the third time period, which is longer than the first time period and is shorter than the second time period, has elapsed. Thus, even when there is no information given by the occupant, it is still possible to effectively refresh the occupant.

An air blowing system in accordance with Aspect 4 of the present disclosure is configured so that the stop-of-blowing setting section sets the blowing stopping timing to a timing at which after lapse of the first time period, the second time period, or the third time period from the blowing starting timing, the predetermined time period for which the air is blown at a decreased airflow volume has elapsed.

With this configuration, after the timing at which the first time period, the second time period, or the third time period has elapsed from the blowing starting timing, the air is blown for the predetermined time period with the airflow volume thereof decreased. Thus, it is possible not only to save energy such as electric power, but also to decrease inconvenience that may be felt by the refreshed occupant.

An air blowing system in accordance with Aspect 5 of the present disclosure is configured so that the start-of-blowing setting section sets the blowing starting timing to a timing at which a fourth time period has elapsed from start of traveling of the moving object.

With this configuration, blowing of air is started automatically on the basis of what period of time has elapsed from start of traveling of the moving object. Thus, even if the occupant were to feel so sick that it is difficult to carry out the input operation or the like, it is possible to refresh the occupant.

An air blowing system in accordance with Aspect 6 of the present disclosure further includes a storage section configured to store therein the information given in advance by the occupant about how easily the occupant recovers from motion sickness, together with identification information of the occupant, and the air blowing system is configured so that the stop-of-blowing setting section sets the blowing stopping timing in accordance with the information on the occupant about how easily the occupant recovers from motion sickness stored in the storage section, for the occupant identified in accordance with the identification information.

With this configuration, the personal identification of the occupant is performed and the blowing stopping timing is set in accordance with the information on the identified occupant about how easily the occupant recovers from motion sickness stored in the storage section. Thus, it is possible to effectively refresh the occupant in accordance with the occupant's disposition.

REFERENCE SIGNS LIST

C Vehicle (moving object)
1 Air blowing system
10 Air blowing device
20 Switch
30 Input device
40 In-vehicle communication network
100 Air blowing section
100A Blower
100B Ventilator
100C Ventilator
101 Control section
102 Storage section
103 Start-of-blowing setting section
104 Stop-of-blowing setting section
T1 First time period
T2 Second time period
T3 Third time period
T4 Fourth time period

The invention claimed is:

1. An air blowing system comprising:
an air blowing section, including a blower, a ventilator or an air conditioner, that blows air into an environment in which an occupant of a moving object is present;
a control section, executed by a computer including at least one processor, that controls the air blowing section to perform blowing air;
a start-of-blowing setting section, executed by the computer, that causes the control section to cause the air blowing section to start blowing air at a high airflow volume at a blowing starting timing which the occupant turns on a seat reclining switch for causing a seat to recline; and
a stop-of-blowing setting section, executed by the computer, that causes the control section to cause the air blowing section to stop blowing air at a blowing stopping timing at which the occupant turns off the seat reclining switch, or at which a first predetermined time period has elapsed from the blowing starting timing, wherein
the control section decreases an airflow volume of the air blowing section from the high airflow volume toward a low airflow volume after a second time period has elapsed from the blowing starting timing, and does not increase the airflow volume of the air blowing section from the low airflow volume until the air blowing section stops blowing air at the blowing stopping timing,
the second time period is set in accordance with information given in advance by the occupant about how easily the occupant recovers from motion sickness, and
the second time period which is set when the occupant has given information that the occupant does not easily recover from motion sickness, is longer than the second time period which is set when the occupant has given information that the occupant easily recovers from motion sickness.

2. The air blowing system according to claim 1, wherein the second time period which is set when the occupant has given no information about how easily the occupant recovers from motion sickness is shorter than the second time period which is set when the occupant has given information that the occupant does not easily recover from motion sickness, and
the second time period which is set when the occupant has given no information about how easily the occupant recovers from motion sickness is longer than the second time period which is set when the occupant has given information that the occupant easily recovers from motion sickness.

3. The air blowing system according to claim 1, wherein the start-of-blowing setting section causes the control section to cause the air blowing section to start blowing air at the blowing starting timing at which the occupant turns on the seat reclining switch, and at which a third predetermined time period has elapsed from start of traveling of the moving object.

4. The air blowing system according to claim 1, further comprising a storage section, including at least one memory, that stores therein the information given in advance by the occupant about how easily the occupant recovers from motion sickness, together with identification information of the occupant.

5. The air blowing system according to claim 1, wherein the control section maintains the low airflow volume after the airflow volume of the air blowing section is reduced to the low airflow volume until the air blowing section stops blowing air at the blowing stopping timing.

6. The air blowing system according to claim 1, wherein the control section starts decreasing the airflow volume of the air blowing section from the high airflow volume at a first timing at which the second time period has elapsed from the blowing starting timing, gradually decreases the airflow volume of the air blowing section toward the low airflow volume until the airflow volume reaches the low airflow volume at a second timing which is after the first timing and before the blowing stopping timing, and maintains the low airflow volume from the second timing to the blowing stopping timing.

7. The air blowing system according to claim 1, wherein the control section does not increase the airflow volume of the air blowing section after the air blowing section starts blowing at the blowing starting timing and before the blowing stopping timing.

* * * * *